Oct. 1, 1957  W. D. EBERLY  2,808,287
COLLAPSIBLE TRAILER
Filed Dec. 9, 1954
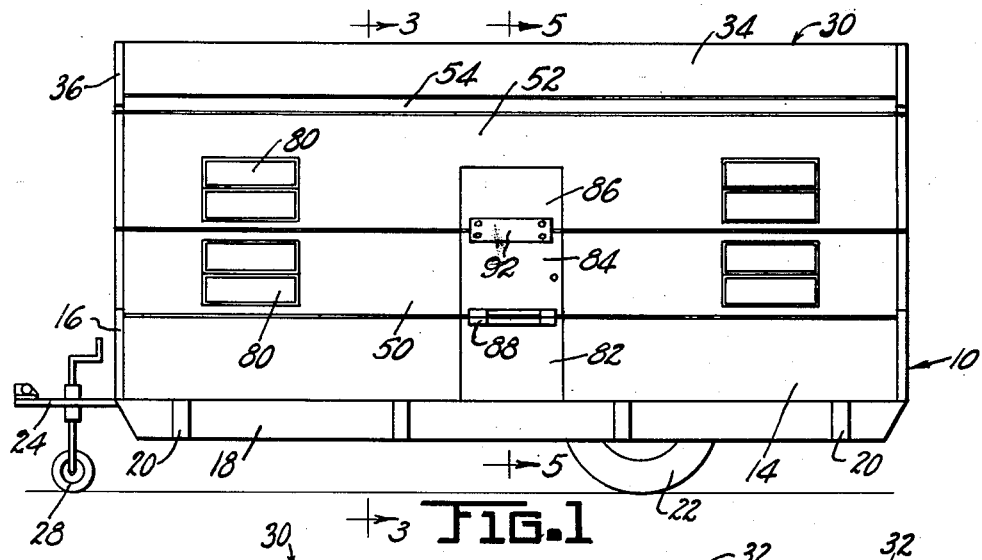
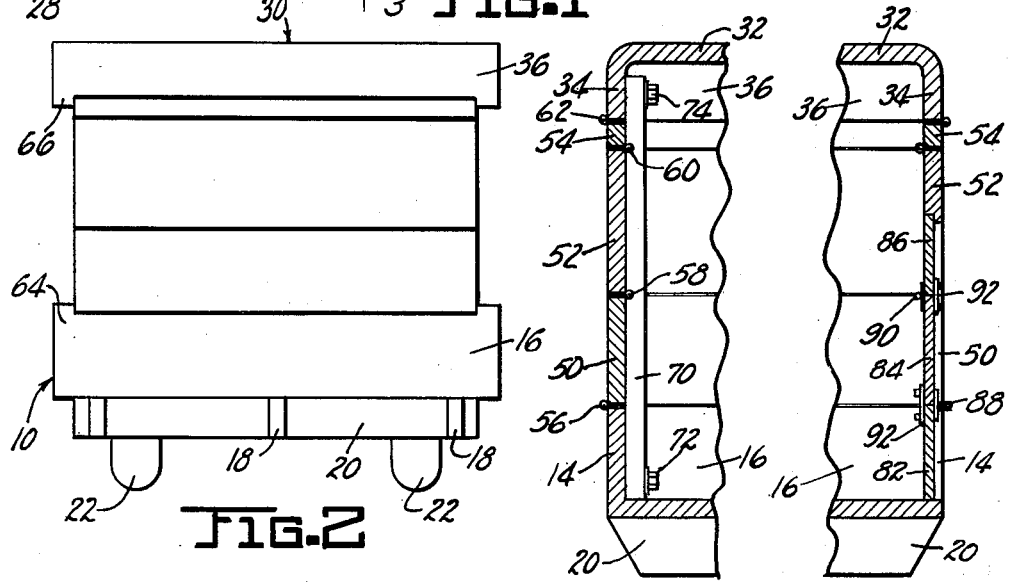
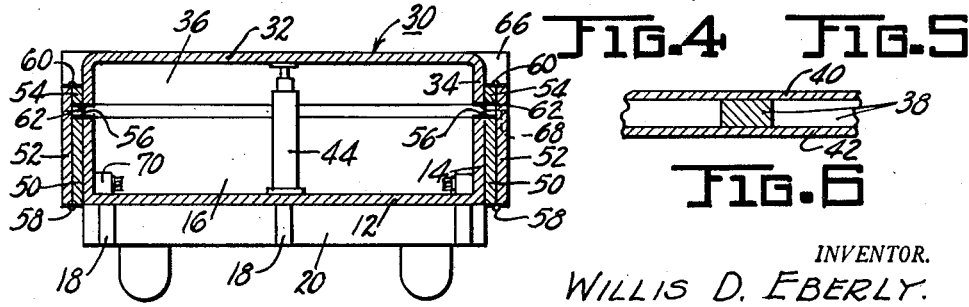
INVENTOR.
WILLIS D. EBERLY.
BY
Eugene C. Knoblock
ATTORNEY.

United States Patent Office 2,808,287
Patented Oct. 1, 1957

2,808,287

COLLAPSIBLE TRAILER

Willis D. Eberly, South Bend, Ind.

Application December 9, 1954, Serial No. 474,058

1 Claim. (Cl. 296—23)

This invention relates to improvements in collapsible trailers, and more particularly to trailers of the type employed to provide living quarters or storage quarters when standing and adapted to be collapsed so as to render towing and transport thereof convenient, easy and free from the problems and difficulties which commonly are associated with the transportation of large trailers, such as trailer coaches, semi-trailers and the like.

The primary object of this invention is to provide a trailer which is collapsible to a predetermined shallow vertical dimension, which is sturdy and rigid in both erected and collapsed positions, which is simple in construction, which is easily erected and collapsed, and which is formed of a minimum number of parts.

A further object is to provide a device of this character having a rigid bottom section and a rigid top section and foldable side walls interposed between said sections and adapted to be locked in aligned extended position and to be effective in collapsed position to hold the parts in assembled relation substantially protected against injury and against weather, leakage, and the like.

Other objects will be apparent from the following specification.

In the drawing:

Fig. 1 is a view of the trailer in erect position and in side elevation;

Fig. 2 is an end view of the trailer in erect position;

Fig. 3 is a transverse sectional view of the trailer taken on line 3—3 of Fig. 1, and illustrating the body in collapsed position;

Fig. 4 is a fragmentary vertical transverse sectional view taken on line 3—3 of Fig. 1 and illustrating the trailer body in erected position;

Fig. 5 is a vertical sectional view similar to Fig. 4 taken on line 5—5 of Fig. 1 to illustrate the arrangement of the door in the device; and Fig. 6 is an enlarged sectional detail view.

Referring to the drawing which illustrates the preferred embodiment of the invention, the numeral 10 designates a lower body portion or bed of the trailer. This bed or body is preferably of rigid and unitary construction and includes a bottom 12, side panels 14 and end panels 16. The side and end panels are preferably of the same height and are fixedly secured together and to the bottom so that the unit 10 is rigid and of requisite strength for use as a trailer bed. Any suitable undercarriage may be provided, such as longitudinal frame members 18 and transverse frame members 20 cooperating with the bottom 12 to provide a rigid structure and also cooperating with the running gear, including wheel units 22 and spring suspensions therefor to render the unit mobile. A portion of the frame or undercarriage of the unit may extend forwardly to provide a tongue portion 24. The tongue 24 will preferably carry a detachable hitch mechanism of any conventional form or other desired form well known in the art, and also may include a drop wheel structure 28 to accommodate support of the tongue-mounting end of the trailer when disconnected from a towing vehicle (not shown).

A rigid top unit 30 is included in the device and may be of any suitable structure. The top unit includes the top wall 32, depending side walls 34, and depending end walls 36, all rigidly secured together in any suitable manner.

Any construction of the types well known in the art may be employed. Thus a conventional construction for each of the units 10 and 30, and also for other units of the device to be described hereinafter, may include a rigid skeleton framework formed of wood or metal and identified by the numeral 38 which may consist of both longitudinal and transverse members insofar as the horizontal parts are concerned, and of horizontal and vertical members insofar as vertical panels are concerned, together with inner and outer sheath members. Thus outer sheath members 40 may be formed from metal, composition board, or like material, adapted to be bent to shape and to produce a weather sealed exterior surface, and the inner sheath 42 may be formed of plywood, composition board, metal panels or any other material found suitable.

The two units 10 and 30 will have the same dimensions horizontally considered, that is, substantially the same length and breadth. By this means the side walls 14 and 34 and the end walls 16 and 36 of the two units may be substantially aligned, as illustrated in Figs. 3 and 4, in the operative position thereof both when erected and when collapsed.

Any suitable means may be provided for elevating and lowering the top unit 30 between extended and collapsed position. As here illustrated in Fig. 3, a screw jack 44 may be provided for this purpose, or any number of such jacks found suitable. Thus one jack can be located at each of the two ends of the device, or four jacks may be employed, one adjacent each corner of the device. The throw or extension of the jack will preferably be such, as through multiple telescoping unit construction thereof, so that in the collapsed position, the bottom edges of the panels 34, 36 of the top unit 30 will be positioned adjacent the top edges of the panels 14, 16 of the lower unit 10, while in extended position the height of the structure may be increased materially. I contemplate that the extension of the structure will preferably be such that it will be substantially twice as tall in erected position as in the collapsed position, said arrangement being illustrated, respectively, in Figs. 4 and 3. Jack 44 may have exteriorly accessible operating means.

An intermediate hinged wall section or assembly is interposed between the bottom unit 10 and the top unit 30 at each of the four sides or walls thereof. This intermediate wall structure preferably includes three panels 50, 52, 54, pivotally connected to each other, and also pivotally connected to portions of the top and bottom units 10 and 30. Each of the panels 50, 52, 54 will extend substantially full length or full width of the trailer body, depending upon whether the same are located at the sides or ends thereof. Each of the panels will be rigid and may have a hollow construction of the character previously described or may be of any other panel construction found suitable. The lowermost panel 50 is hinged at 56 along its length to the upper edge of the adjacent member of the lower trailer structure, that is, to the top edge of one of the upright panels 14 or 16. The hinge 56 will preferably extend substantially full length of the panel and may be a piano-type hinge. The hinge plates will preferably bear against the edges of the portions to be connected thereby so as to be located between said panels and to accommodate substantial alignment of said panels when erected, as illustrated in Fig. 4. As here illustrated, the hinge 56 will have its pivot axis located at the exterior of the body so that the panel 50 may swing downwardly and outwardly relative to the adjacent panel, such as the panel 14 illustrated in Fig. 4, between the erected or extended position illustrated in Fig. 4 and the collapsed position illustrated in Fig. 3. The vertical dimension of the panel 50 will preferably be substantially equal to the vertical dimension of the side and end panels 14 and 16 of the lower structure, so as to lie alongside the same and be substantially coextensive therewith, as illustrated in Fig. 3.

The intermediate hinged panel 52 is of greater vertical dimension than the panel 50 and is preferably formed of the same construction as panel 50. Panel 52 is hinged to panel 50 by hinge 58 similar to hinge 56 but has its pivot axis preferably located oppositely, that is, located at the inner surface of the panel, as illustrated in Fig. 4. The hinge 58 accommodates positioning of the panel 52 in alignment and in the same plane as the panel 50 when erected, as illustrated in Fig. 4, and in a position lying alongside and externally of the panel 50, as illustrated in Fig. 3. Because of the greater vertical dimension of the panel 52 than the panel 50, the upper margin thereof projects substantially above the level of the top of the bottom unit 10 of the trailer when in collapsed position, as illustrated in Fig. 3.

The panel 54 is comparatively narrow in its vertical dimension, and preferably its vertical dimension is less than the difference between the vertical dimensions of the panels 52 and 50. The panel 54, like panels 50 and 52, is rigid and extends substantially full length of the structure at the side or end at which it is located. A hinge 60 similar to the hinges 56 and 58 pivotally connects the panels 52 and 54. The hinge 60 is oriented similarly to the hinge 58, that is, with its hinge axis located interiorly of the structure. At its upper edge the panel 54 is hinged at 62 to the bottom margin of the structure 30, at one of the members 34, 36 thereof. The hinge 62 is preferably similar to and oriented similarly to the hinge 56. This arrangement of parts permits the panel 54 to be aligned with the adjacent panel 52 and with that part 34, 36 of the upper structure to which it is connected. Also, the arrangement accommodates the positioning of the upper panel 54 between the upper end of the panel 52 and the vertical panel 34, 36 of the upper structure 30 in the collapsed position of the structure illustrated in Fig. 3. The collapsed position may entail support of the weight of the top structure through the intermediate panels and their respective hinges, as seen in Fig. 3; whereas, in the erected position of the parts, the panels, being vertically aligned with one another, will have edge abutment for support thereof with only incidental supporting function served by the respective hinges.

The top edges of the end panels 16 and 36 of the top and bottom units, respectively, are spaced apart in the collapsed position of the device, as illustrated in Fig. 3. This fact, coupled with the positioning of the panels 50, 52, 54 exteriorly of the device when folded to collapsed position, results in the occurrence of gaps at the corners of the structure between adjacent edges of the panels 16 and 36 when the device is collapsed. In order to seal such gaps, the end panels 16 and 36 are preferably provided with projections 64 and 66, respectively, extending in the plane thereof and projecting both laterally and vertically relative to said panels. The lateral extension will be greater than the thickness of the panels 50 and 54, or greater than the spacing of the inner surface of the panel 52 from the outer surfaces of the side walls 14 and 34. The vertical projection of the parts 64 and 66 relative to panels 16 and 36 will be such as to permit the edges of the panel projections 64, 66 to abut, as at the plane 68. In a construction of this character, where the side walls fit between the end walls in erected position of the device, that is, in which the end walls are of a length equal to the spacing between the outer surfaces of the side walls when the device is erected, the wing members 64 and 66 will serve to close the gaps occurring at the corners between the top and bottom frame units, thereby rendering the device substantially weather-tight in its collapsed position.

The trailer body is provided with means for locking the parts in operative position when erected. As here illustrated, such means may consist of rigid struts 70 which are anchored at their lower end portions at 72 to the lower frame structure 10 and similarly are anchored at 74 at their upper end portions to the upper frame structure 30. The struts 70 will preferably be positioned adjacent to the corners of the structure so as to serve the dual purpose of holding the trailer body erect and also of improving the seal between the panels at the corners of the structure. The strut may be mounted in any of a number of ways, but I prefer to render it completely detachable as by providing securing means and brackets for its proper attachment to the structure. If desired, each strut may be pivoted, in which event the struts will fold or collapse to flat position in the structure, as illustrated in Fig. 3. This arrangement is feasible in instances where adequate space exists without interference from physical elements or from the contents of the trailer body when collapsed and, therefore, pivoted struts have less utility as applied to a trailer coach used as a living quarter and containing furniture, or the like, than for freight trailers.

Where the trailer is employed as a living quarter so as to require windows to light the interior thereof, the windows will preferably be arranged substantially as illustrated in Fig. 1; that is, they will be positioned entirely within the confines of a panel structure. Since the height at which a window is located is important for purposes of vision and lighting, and since the panels 50 and 52 will be located at mid-height of the trailer as erected, it is preferred that the windows be located in panels 50, 52, as illustrated at 80 in Fig. 1. In other words, the window frames will preferably be of such size and will be so located that they are completely confined within the borders of a panel, as illustrated.

In instances where an opening is required in the erected trailer of a height sufficient to permit a person to walk therethrough, as in cases of trailers used as living quarters, it is necessary to provide a door. One construction of such a door is illustrated in Figs. 1 and 5. As here illustrated, the door consists of a plurality of panels identified as panels 82, 84 and 86. The panel 82 is pivoted in the door opening interrupting the side wall 14 of the lower unit 10; the panel 84 pivotally spans the interruption in a side panel 50; and the panel 86 is pivoted in an opening preferably extending only part-height in the panel 52. The panels 82 and 84 are interconnected by a hinge 88, and panels 84 and 86 are interconnected by a hinge 90. The hinge 88 preferably is a piano-type hinge and has its pivot axis substantially exactly aligned with the pivot axis of the hinge 56. The hinge 90 is likewise preferably a piano-type hinge and has its pivot axis projected clear thereof to be aligned with the pivot axis of the hinge 58. The arrangement is such that the door panels 84 and 86 hinge with the panels 50 and 52 in which they are located during the collapsing and erecting of the device. When the structure is erected, reinforcing or latching plates 92 may be employed to secure adjacent panels together in aligned position in cooperation with respective hinges. Such plates may be detachably or shiftably carried by the panels which they connect, so as to readily accommodate removal or shifting thereof and resultant pivoting of the door panels during the collapse and erection of the structure.

There may occur occasions when the owner or user of a trailer desires to enter the same while it is in collapsed position, as for access to contents of the body or access to the jack 44 or other parts of the device, for purposes of repair. In such instances access must be had to the interior through the top or the bottom because of the multiple thicknesses of the side walls, as best seen in Fig. 3. Accordingly, a trap door will be provided in either the bottom panel 12 or the top panel 32 accessible exteriorly of the device and operable to provide an opening through which a person may pass into the interior of the trailer in its collapsed position. The body may be of sufficient height when collapsed to have storage capacity for furniture or other items to be transported. Thus I prefer to so orient the parts that there will be at least three feet between the floor and the roof panels in the collapsed position of the parts.

While the preferred embodiment of the invention has been illustrated and described herein, it will be understood that changes in the construction may be made within the scope of the appended claims without departing from the spirit of the invention.

I claim:

A collapsible trailer body comprising a rigid bottom unit having a bottom panel and vertical side and end panel, a rigid top unit having a top panel and depending side and end panels, folding wall units each comprising three horizontally hinged panels and interconnecting the side and end panels of said top and bottom units, and means for locking said folding unit in extended position supporting said top unit the upper and lower panels of said folding wall units swinging outwardly from said top and bottom units, respectively, and said intermediate panel overlying said upper and lower unit in collapsed position and being of a vertical dimension greater than the sum of the vertical dimensions of said upper and lower panels and coplanar projections extending vertically and laterally from a pair of opposed vertical panels of both of said top and bottom units and adapted to bear against and protect the opposite ends of the outwardly folded panels of the folding wall units perpendicular to said projections to close the corners of said body when collapsed.

References Cited in the file of this patent

UNITED STATES PATENTS

| | | |
|---|---|---|
| 1,863,206 | Quinn | June 14, 1932 |
| 1,998,937 | McGinnis | Apr. 23, 1935 |
| 2,202,747 | Roloson | May 28, 1940 |

FOREIGN PATENTS

| | | |
|---|---|---|
| 106,216 | Australia | Dec. 19, 1938 |
| 311,089 | Great Britain | May 9, 1929 |